United States Patent
Kuralenok et al.

(10) Patent No.: US 10,282,358 B2
(45) Date of Patent: May 7, 2019

(54) METHODS OF FURNISHING SEARCH RESULTS TO A PLURALITY OF CLIENT DEVICES VIA A SEARCH ENGINE SYSTEM

(71) Applicant: YANDEX EUROPE AG, Lucerne (CH)

(72) Inventors: Igor Evgenyevich Kuralenok, Saint-Petersburg (RU); Mikhail Sergeevich Ageev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 279 days.

(21) Appl. No.: 15/281,575

(22) Filed: Sep. 30, 2016

(65) Prior Publication Data

US 2017/0091192 A1     Mar. 30, 2017

(30) Foreign Application Priority Data

Sep. 30, 2015   (RU) ............................... 2015141517

(51) Int. Cl.
*G06F 7/00*      (2006.01)
*G06F 17/30*     (2006.01)
(Continued)

(52) U.S. Cl.
CPC ...... *G06F 16/24578* (2019.01); *G06F 16/248* (2019.01); *G06F 16/27* (2019.01); *G06F 16/951* (2019.01)

(58) Field of Classification Search
CPC .......... G06F 17/3053; G06F 17/30864; G06F 17/30554
(Continued)

(56) References Cited

U.S. PATENT DOCUMENTS 6,539,377 B1    3/2003  Culliss
8,015,502 B2    9/2011  Luvogt et al.
(Continued)

FOREIGN PATENT DOCUMENTS

RU    2419860 C2    5/2011
RU    2435212 C2    11/2011
RU    2543315 C2    2/2015

OTHER PUBLICATIONS

Bailey et al., Evaluating Whole-Page Relevance, SIGIR'10, Jul. 19-23, 2010, Geneva, Switzerland, 2 pages.
(Continued)

*Primary Examiner* — Md I Uddin
(74) *Attorney, Agent, or Firm* — BCF LLP

(57) ABSTRACT

Method of furnishing search engine system search results, comprising: Receiving a search query including information indicative of a property of an application originating the search query. Effecting a search of posting lists to determine search results in respect of the search query, the search results having a relevance rank order. Determining a probable user search result interaction sequence based on information related to previous user interactions with search results having been provided by the system and based on the information indicative of the property of the application originating the search query. The probable user search result interaction sequence being different from the relevance rank order of the search results. Sending the search results, including information allowing for visual configuration of the search results provided to the user by the application originating the search query according to the probable user search result interaction sequence, while maintaining the relevance rank order.

18 Claims, 10 Drawing Sheets

(51) Int. Cl.
    *G06F 16/2457* (2019.01)
    *G06F 16/27* (2019.01)
    *G06F 16/248* (2019.01)
    *G06F 16/951* (2019.01)

(58) Field of Classification Search
    USPC ........................................ 707/706, 748, 749
    See application file for complete search history.

(56) References Cited

U.S. PATENT DOCUMENTS

| | | |
|---|---|---|
| 8,606,769 B1 | 12/2013 | Berry |
| 8,762,364 B2 | 6/2014 | Parekh et al. |
| 8,762,373 B1 | 6/2014 | Zamir et al. |
| 2002/0103798 A1 | 8/2002 | Abrol et al. |
| 2005/0149498 A1 | 7/2005 | Lawrence et al. |
| 2007/0260597 A1 | 11/2007 | Cramer |
| 2009/0119278 A1 | 5/2009 | Cross et al. |
| 2009/0234814 A1 | 9/2009 | Boerries et al. |
| 2012/0311130 A1* | 12/2012 | Zadig ............... H04L 12/66 709/224 |
| 2013/0246383 A1 | 9/2013 | White et al. |
| 2013/0246412 A1 | 9/2013 | Shokouhi et al. |

OTHER PUBLICATIONS

Joho et al., A Comparative Study of the Effectiveness of Search Result Presentation on the Web, Department of Computing Science, University of Glasgow, 12 pages.

Russian Search report dated Jan. 13, 2017 from Russian patent application No. 2015141517.

* cited by examiner

METHODS OF FURNISHING SEARCH RESULTS TO A PLURALITY OF CLIENT DEVICES VIA A SEARCH ENGINE SYSTEM

CROSS-REFERENCE

The present application claims priority to Russian Patent Application No. 2015141517, filed Sep. 30, 2015, entitled "METHODS OF FURNISHING SEARCH RESULTS TO A PLURALITY OF CLIENT DEVICES VIA A SEARCH ENGINE SYSTEM", the entirety of which is incorporated herein by reference.

FIELD

The present technology relates to methods of furnishing search results to a plurality of client devices via a search engine system.

BACKGROUND

Currently, the Internet provides access to a vast amount of information. Generally speaking, a user can access a resource on the communications network by two principle means. The user can access a particular resource directly, either by typing an address of the resource (typically an URL or Universal Resource Locator, such as www.webpage.com) or by clicking a link in an e-mail or in another web resource. Alternatively, the user may conduct a search using a search engine to locate a resource of interest. The latter is particularly suitable in circumstances where the user knows a topic of interest, but does not know the exact address of the resource he is interested in.

There are numerous search engines available to the user. Some of these are considered to be general purpose search engines (such as Yandex™, Google™, Yahoo™ and the like). Others are considered to be vertical search engines— i.e. search engines dedicated to a particular topic of search— such as Momondo™ search engine dedicated to searching flights.

Irrespective of which search engine is used, it is known in the art that the search engine is generally configured to receive a search query comprising a single or multiple search terms from a user, which can be submitted by the user from a variety of client devices (desktop, laptop, notebook, smartphone, tablets, etc.) in which a variety of applications can be running. The search engine then performs the search and identifies a plurality of documents matching the one or more search terms.

Typically, the search engine presents the search results to the user on a search engine results page (SERP) generated by the search engine. The search results are organized on the page in a specific manner determined by the search engine. Usually, the search results are organized in a generally vertical list in which the most relevant search result is presented first (i.e., at the top of the SERP), followed by the next most relevant search result (i.e., immediately below the most relevant search result), and so on. A generic description of a conventional SERP may be that published by Google Inc. found at www.googleguide.com/results_page.html, which is incorporated herein by reference in its entirety for all purposes.

In order to determine the sequence in which the search results will appear on the SERP, the search engine generally ranks search results according to their relevance using a ranking algorithm which may take into account various factors indicative of relevance. This is known in the art as query specific ranking, or "QSR". A fuller discussion of search engine ranking concepts and operations may be found in International Application Publication No. WO 2015/004607 A2, published Jan. 15, 2015, entitled "Computer-Implemented Method of and System for Searching an Inverted Index Having a Plurality of Posting Lists" (the "'607 Application", which is incorporated by reference in its entirety for all purposes. As is discussed in the '607 Application, one of the ways in which a search engine system derives a query specific ranking is via information, such as click-through data described in that Application, related to users' interactions with search results provided in respect of specific search queries. Click-through data is not the only type of information related to users' interactions with search results available to search engine systems to improve on QSR derivation. Other information, such as that related to users' cursor movements and users' gaze tracking, is also conventionally available to search engine systems for this purpose.

While conventional methods of organizing search results on a SERP according to their QSR are adequate and of deriving a QSR itself are adequate for their intended purposes, additional improvements are possible and might be useful in certain circumstances.

SUMMARY

It is thus an object of the present technology to improve searching via search engines.

The conventional visual configuration of search results on a SERP (as described above) is believed to be optimal as it is premised on the belief that it is in this manner that users actually interact with the search results. Ie., it pre-supposes that when presented with a SERP, users look first to the first listed search result at the top of the page, assuming it to be the most relevant. And, if it is not, then users progress down the page, from the top to the bottom, looking at each listed search result in the list sequentially, until they find the search result most matching the information that they were seeking.

It has been discovered that, in actual fact, this is not always the case. Users do not always interact with a SERP in this manner For example, there are circumstances where a user starts by looking at a listed search result at the top of the SERP and then they progress irregularly through the search results. In a more specific example, for a given set of search results being a list of 6 items shown on a SERP in QSR (or more rarely in QIR order—whichever the case may be in a particular circumstance, being referred to hereinafter as "relevance rank order"), a user provided with the search results may first look at the first listed search result at the top of the SERP. If that first listed search result does not provide the user with the information that they are seeking, the user may then (unexpectedly) jump to the fifth listed search result from the top of the page. If that fifth listed search result does not provide the user with the information they are seeking, the user may then jump back to the second listed search result from the top of the page, and so on as the case may be. (This description is intended only an example of the concept attempting to be explained, and not as a description of what always actually occurs for every (or any) given SERP.)

Moreover, starting at the top of the page with the first listed search result is not always the case either. In a specific non-limiting example, for a given set of search results being a list of 6 items shown on a SERP in QSR, the user may start with the fourth listed search result from the top of the page. If that fourth listed search result does not provide the user with the information that they are seeking, the user may then jump to the sixth listed search result from the top of the page. If that sixth listed search result does not provide the user with the information that they are seeking, the user may then jump to the second listed search result from the top of the page, and so on as the case may be. (Again, this description is intended only an example of the concept attempting to be explained, and not as a description of what always actually occurs for every (or any) given SERP.)

In addition, in some circumstances, user behavior on a SERP may even be non-columnar. For example, in an example similar one of those described above, the user may first look at the first listed search result at the top of the SERP, then move to a specialized result on the right hand side of the SERP, followed by looking at the fifth listed search result in the middle of the SERP, and then followed by returning to the second listed search result near the top of the SERP.

Conventionally, user interactions with the SERP in the manner described in the above examples are taken into account when determining a QSR for similar search queries in the future. This is premised on the belief that users quickly scan the search result listing, determine which one of the listed search results is the most relevant to the information that they are seeking, and start there. If that listed search result does not provide them with the information that they are seeking, then they go back to the search result listing and move to the listing that is then the one that they believe is most relevant to the information that they are seeking. And so on, and so forth, until they find the information that they are seeking. Thus, the search engine system collects data on which of the results of a search engine results listing are considered by the users of the system to be relevant to a search query, and in which order they should be ranked. The goal being to having a search engine results listing being in perfect QSR. In a very over-simplistic example (used for illustrative purposes only), the next time that a user runs that particular search query, the search result listing could have its individual listings re-ordered to be in the order (starting from the top of the SERP) that had been determined to be most relevant based on the prior user's interactions with the SERP as described above.

In the aforementioned examples, a user "starting" with a particular listed search result, does not necessarily mean that a user "clicks" on that search result (although it may), only that the user considers the information present on the SERP about that particular listed search result to determine whether or not relevant information has been provided to them. Typically, conventionally, this is judged by tracking user cursor movements or user eye gazing, as well as user click-throughs and returns to the SERP.

What has been realized is that that premise set forth above no longer holds true in some circumstances. In some circumstances, counterintuitively, users actually start with a listed search result that is actually a lower ranked search result than the highest ranked search result for reasons other than the fact that they believe that the listed search result that they are starting with is the most relevant of the listed search results provided. Without wishing to be bound by any particular theory, it may be that the reason users so act is related to how they are accessing the search engine system. For example, if the search engine system is being accessed through a desktop web-brower, the search results will be provided in a very different visual format than if the search engine system is being accessed though a dedicated app on a smartphone. The former will usually provide the results along with other information in a graphically rich format (which format can differ greatly as is described hereinbelow.) The latter will usually provide the results as a simply list of textual items, without any graphics.

For example, today's SERPs are in many cases no longer simple single column textual listings of search results having a hyperlink to the URL of internet resource (being the search result) with a textual snippet providing a bit of a preview of the information that can be found on that resources. For example, in FIG. 1, there is a shown a conventional SERP 10 of the Google™ search engine system operated by Google Inc. for the search query "eiffel tower", accessed via a desktop web browser. As can be seen in the figure, the SERP is generally divided into two columns 12,14. In the left column 12, there is a listing of URLs that the search engine system believes to be relevant to the specific query "eiffel tower" listed in QSR order, along with a textual snippet of information that may be found at that URL, 16a, 16b, 16c, 16d, 16e, 16f, 16g. In the middle of the column 12, below the third listed search result 16c and above the fourth listed search result 16d, is a news search result section 18 and an images search result section 20. The news search result section 18 provides a listing of news items relevant to the search query "eiffel tower". The images search result section 20, providing a collection of images relevant to the search query "eiffel tower". In the right column 16, there is an "object card" 22 for the "eiffel tower" object. The object card 22 provides a map snippet 24 showing the location of the Eiffel Tower in Paris, France as well as an image 26 of the Eiffel Tower in Paris, France. (The Eiffel Tower in Paris, France, being the most probable object resulting form the search query "eiffel tower".) In addition, the object card contains (i) a snippet 28 from the Wikipedia™ entry on the Eiffel Tower in Paris, France; (ii) information 30 related to popular visiting times for the Eiffel Tower in Paris, France (source unknown); (iii) reviews 32 of the Eiffel Tower in Paris, France (from Google™ Reviews); and (iv) an indication 34 of some other searches that people who have submitted the search request "eiffel tower" have also submitted.

The visual effect of a SERP such as the one shown in FIG. 1, is very different from a more conventional SERP, such as the one shown in FIG. 2. The SERP shown in FIG. 2 is a conventional SERP 40 of the DuckDuckGo™ search engine system operated by DuckDuckGo, Inc. for the search query "eiffel tower", accessed via a desktop web browser. As can been seen in the figure, the SERP 40 is generally of a single column configuration. At the top of the SERP 40 there is a simple object card 42. Below the object card 42 are two simple textual side-by-side advertisements 44a, 44b. Below the two advertisements 44a, 44b a listing of URLs that the search engine system believes to be relevant to the specific query "eiffel tower" listed in QSR order, along with a textual snippet of information that may be found at that URL, 46a, 46b, 46c, 46d.

The visual effect of SERP such as the one shown in FIG. 3, is very different from the ones shown in FIGS. 1 & 2. The SERP shown in FIG. 3 is a conventional SERP 50 of the Yandex™ search engine system operated by Yandex LLC for the search query "eiffel tower", accessed from a dedicated app running under iOS on Apple Inc.'s iPhone™ smartphone. As can been seen in the figure, the SERP 50 is of a single column configuration providing a simple textual listing of URLs that the search engine system believes to be relevant to the specific query "eiffel tower" listed in QSR order, along with a textual snippet of information that may be found at that URL, 52a, 52b, 52c. No other information is provided on SERP 50.

In a more extreme example, when the search engine system is accessed via voice in connection with an intelligent personal assistant (e.g., Apple Inc.'s Siri™ or Microsoft Inc.'s Cortana™), the results will generally simply be spoken words. The search result presented to the user first will generally have been chosen by the search engine system itself, without any choice having first been offered to the user. There is little or no visual presentation of the search results at all, and no SERP is provided to the user for use in selection among the various search results.

Keeping this in mind, again, without wishing to be bound by any particular theory, it appears that the method of presentation of the search results is influencing user interaction with the search results. The difficulty this scenario presents is that the QSR of the search results should generally be the same no matter how the user is interacting with the search engine system (although it may vary between search engine system). Thus, for a given identical (in every respect) search query, no matter how the search engine system is accessed, the search results should be the same. Yet conventionally, because user interactions with the search results are used in calculating the QSR for future similar search queries, incorrect data is being gathered by the search engine system in this respect. This leads to incorrect QSRs for future similar search queries. For users, incorrect QSRs are in many circumstances a minor inconvenience, since the information that they are seeking is usually still within the top ranked search results, although those search results may be out order. For the search engine system, however, incorrect QSRs are a significant waste of resources. To put this in context, it should be understood that a modern search engine may conduct 50,000 searches per second, every second of every day of month. A number that is not constant, but is ever increasing. Search engine systems need to keep track of users' interactions with the search results, for many varied reasons. One reason is that referred to above, which is to get feedback to improve future searches. But this is not the only one. The more interactions a user has to have with a SERP to find the information that they are seeking, the more resources are required of the search engine system with respect to that one single search. Multiply that inefficiency by every search, and the drain on the search engine system resources becomes enormous. The present technology has resulted from the above realization and a desire to improve search engine efficiency.

Thus, in one aspect, implementations of the present technology provide a method of furnishing search results to a plurality of client devices via a search engine system, the search engine system including:
   at least one server,
   a first database having a plurality of posting lists in electronic communication with the at least one server,
   a second database having information related to previous user interactions with search results having been provided by the system in electronic communication with the at least one server,
   a communications network configured to provide for electronic communication between the at least one server and the plurality of client devices,
the method comprising, via the at least one server:
   receiving a search query from a one of the plurality of client devices via the communications network, the search query including information indicative of a property of an application running on the client device originating the search query;
   effecting a search via at least the first database to determine search results in respect of the search query, the search results having a relevance rank order;
   determining a probable user search result interaction sequence based on information in the second database and on the information indicative of the property of the application running on the one of the client devices originating the search query, the probable user search result interaction sequence being different from the relevance rank order of the search results;
   sending the search results to the one of the client devices via the communications network, the search results including information allowing for visual configuration of the search results provided to the user by the application originating the search query according to probable user search result interaction sequence, while maintaining the relevance rank order.

The present technology attempts to improve upon conventional technology, by having the search engine system keep track of user interactions with search results in order to be able to allow for the visual configuration of search results taking into account a property (or properties) of the application (running on a client device) accessing the search engine system, with modifying the relevance rank order (e.g., QSR) of the search results.

Thus, the present technology may allow (depending on the circumstances) for the visual configuration of the search results to differ in different circumstances, without affecting the relevance rank order.

Thus, in some implementations of the present technology, the client device is provided instructions to display the search results out of relevance rank order (while maintaining the order).

In some implementations of the present technology, the client device is provided with instructions to display the search results in a non-columnar arrangement.

In some implementations of the present technology, the client device is provided with instructions to display the search results in a non-row arrangement.

In some implementations of the present technology, the client device is provided with instructions to display at least one of the search results differently from others of the search results. In some such implementations at least one of the search results has at least one of the following from the other search results: a different font, a different font size, a different color, a different font style, a different font underline, and a different font effect.

In some implementations of the present technology, the client device is provided with instructions to solely display the search results in images associated with a one of the search results next to that one of the search results.

In some implementations of the present technology, the property of an application running on the client device originating the search query is that the application is a desktop web-browser.

In some implementations of the present technology, the information related to previous user interactions with search results having been provided by the system has resulted from use of a machine-learned algorithm.

In some implementations of the present technology the method further comprises,
   receiving from the one of the plurality of client devices via the communications network, information related to then current user interaction with the results; and
   updating the information in the second database information related to previous user interactions with search results having been provided by the system, without updating information in the system related to the relevance rank order.

In another aspect, implementations of the present technology provide a search engine system including:
- at least one server, the server configured to furnish search results to a plurality of client devices via the search engine system in accordance with a method described hereinabove;
- a first database having a plurality of posting lists in electronic communication with the at least one server;
- a second database having information related to previous user interactions with search results having been provided by the system in electronic communication with the at least one server; and
- a communications network configured to provide for electronic communication between the at least one server and the plurality of client devices.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 4:
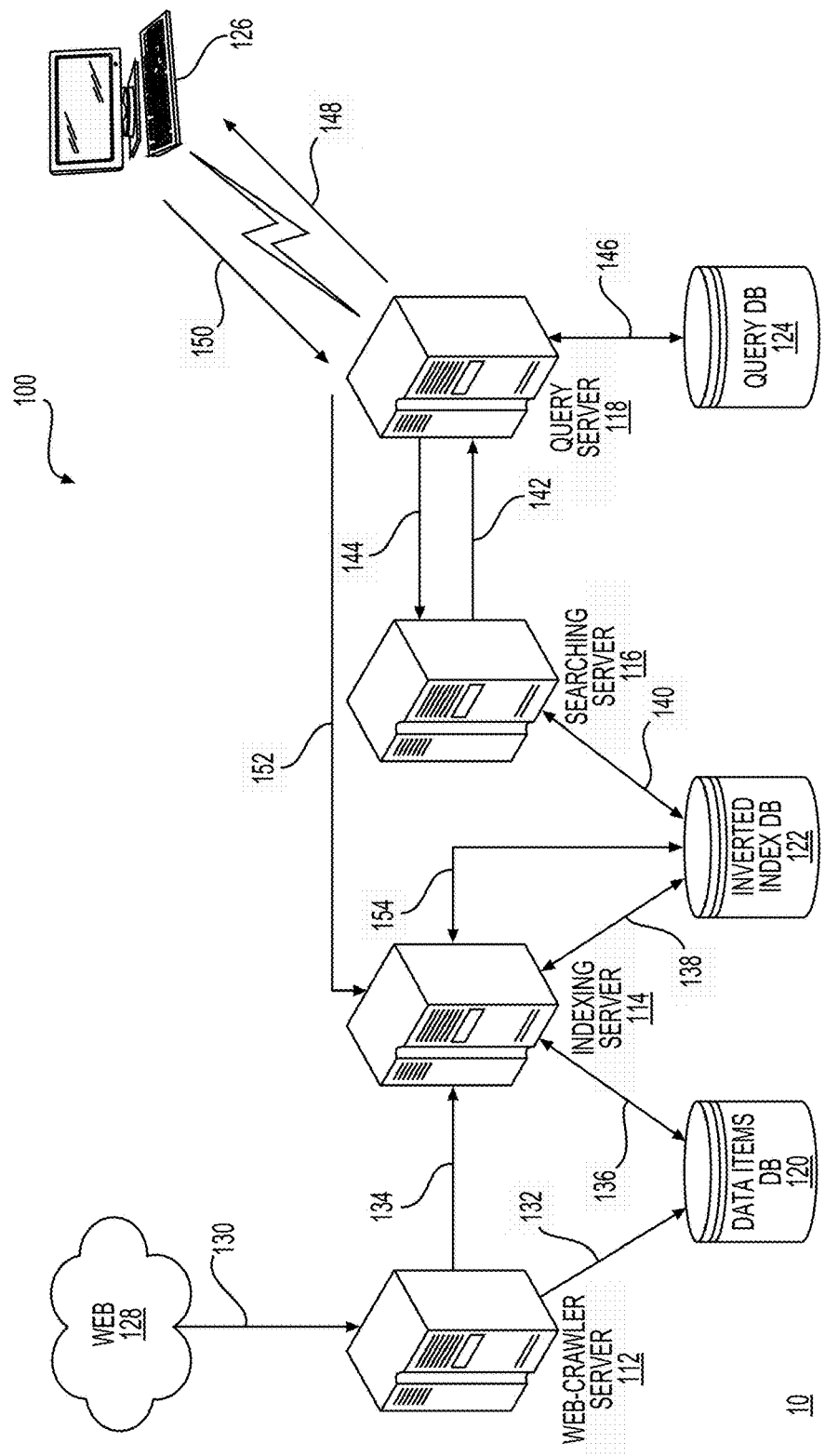
FIG. 4 is a diagram of various networked computer systems in communication with one another via a communications network, including a search engine system according to the present technology.

Referring to FIG. 4, there is shown a diagram of various networked computer systems in communication with one another via a communications network, including search engine system 100. It is to be expressly understood that the various computer systems are merely some implementations of the present technology. Thus, the description thereof that follows is intended to be only a description of illustrative examples of the present technology. This description is not intended to define the scope or set forth the bounds of the present technology. In some cases, what are believed to be helpful examples of modifications to computer systems may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the computer systems may provide in certain instances simple implementations of the present technology, and that where such is the case they have been presented in this manner as an aid to understanding. As persons skilled in the art would understand, various implementations of the present technology may be of a greater complexity.

Search Engines—General Discussion

Typically, in building a search-efficient data collection management system, data items are indexed according to some or all of the possible search terms that may be contained in search queries. Thus, an "inverted index" of the data collection is created, maintained, and updated by the system. The inverted index will comprise a large number of "posting lists" to be reviewed during execution of a search query. Each posting list corresponds to a potential search term and contains "postings", which are references to the data items in the data collection that include that search term (or otherwise satisfy some other condition that is expressed by the search term). For example, if the data items are text documents, as is often the case for Internet (or "Web") search engines, then search terms are individual words (and/or some of their most often used combinations), and the inverted index comprises one posting list for every word that has been encountered in at least one of the documents.

Search queries typically have the form of a simple list of one or more words, which are the "search terms" of the search query. Every such search query may be understood as a request to the search engine to locate every data item in the data collection containing each and every one of the search terms specified in the search query. Processing of a search query will involve searching through one or more posting lists of the inverted index. As was discussed above, typically there will be a posting list corresponding to each of the search terms in the search query. Posting lists are searched as they can be easily stored and manipulated in a fast access memory device, whereas the data items themselves cannot (the data items are typically stored in a slower access storage device). This generally allows search queries to be performed at a much higher speed.

QIR & QSR

Typically, each data item in a data collection is numbered. Rather than being ordered in some chronological, geographical or alphabetical order in the data collection, data items are commonly ordered (and thus numbered) within the data collection in descending order of what is known as their "query-independent relevance" (abbreviated herein to "QIR"). QIR is a system-calculated heuristic parameter defined in such a way that the data items with a higher QIR value are statistically more likely to be considered by a search requester of any search query as sufficiently relevant to them. The data items in the data collection will be ordered so that those with a higher QIR value will be found first when a search is done. They will thus generally appear at (or towards) the beginning of the search result list (which is typically shown in various pages, with those results at the beginning of the search result list being shown on the first page). Thus, each posting list in the inverted index will contain postings, a list of references to data items containing the term with which that posting list is associated, with the postings being ordered in descending QIR value order.

It should be evident, however, that such a heuristic QIR parameter may not provide for an optimal ordering of the search results in respect of any given specific query, as it will clearly be the case that a data item which is generally relevant in many searches (and thus high in terms of QIR) may not be specifically relevant in any particular case. Further, the relevance of any one particular data item will vary between searches. Because of this, conventional search engines implement various methods for filtering, ranking and/or reordering search results to present them in an order that is believed to be relevant to the particular search query yielding those search results. This is known as "query-specific relevance" (hereinafter abbreviated "QSR"). Many parameters are typically taken into account when determining QSR. These parameters include: various characteristics of the search query; of the search requester; of the data items to be ranked; data having been collected during (or, more generally, some "knowledge" learned from) past similar search queries.

Thus, the overall process of executing a search query can be considered as having two broad distinct stages: A first stage wherein all of the search results are collected based (in part) on their QIR values, aggregated and ordered in descending QIR order; and a second stage wherein at least some of the search results are reordered according to their QSR. Afterwards a new QSR-ordered list of the search results is created and delivered to the search requester. The search result list is typically delivered in parts, starting with the part containing the search results with the highest QSR.

In the first stage, the collecting of the search results stops after some predefined maximum number of results has been attained or some predefined minimum QIR threshold has been reached. This is known in the art as "pruning"; and as it occurs, once the pruning condition has been reached, it is very likely that the relevant data items have already been located.

Typically, in the second stage, a shorter, QSR-ordered, list (which is a subset of the search results of the first stage) is produced. This is because an Internet search engine, when conducting a search of its data collection (which contains several billions of data items) for data items satisfying a given search query, may easily produce a list of tens of thousands of search results (and even more in some cases). Obviously the search requester cannot be provided with such an amount of search results. Hence the great importance of narrowing down the search results actually provided to the requester to a few tens of result items that are potentially of highest relevance to the search requester.

Click-Through Data

One of the ways in which the system narrows down the search results is by using "knowledge learned" by from past similar search queries. One very important type of such information from previous search queries is what is termed "click-through" data. At the end of any search query execution, the search requester is usually presented with a search engine result page ("SERP") that shows a portion of the search results. On the SERP, each data item being a search result is typically shown with its title, a hyperlink to the data item's location on the Internet, and a "snippet" (a short citation from the body of the data item typically containing some or all of the search terms of the search query). The information shown on the SERP can be used by the search requester in selecting the data items most interesting to them for further inspection. Typically, the search requester selects just a few of the data items, by clicking on their hyperlinks, to open them for further reading. Thus, many other data items are left alone without too much attention having been paid to them. While not every data item clicked on ("clicked through to") by the search requester will be considered by them as an interesting data item, those "clicked through" data items can nevertheless be considered on average as a group as being of greater interest to the search requester than those data items not clicked through. Such clicked through data items can thus be considered as being of a higher QSR with respect to that search query than the non-clicked through data items.

Such "click through" data is conventionally stored in the search engine's database(s). This information can be very helpful for future similar search queries as it can be used later to improve the QSR-ranking of the search results (for future search queries with the same or mostly the same search terms). When ranking the search results of such a future search query, click-through data from past similar queries can be used to assign the clicked-through data items a higher QSR. Thus, such data items can be shown to the then current search requester before other data items having been found during the result collecting stage (the first stage) of the current search query but that were not clicked-through in the past in respect of similar search queries.

Search Engines—Server Types & Functionalities

Referring to FIG. 4, in one implementation, an Internet search engine system 100 of the present technology, includes four different types of servers (or groups of servers), shown in FIG. 4 as "web-crawler" server 112, "indexing" server 114, "searching" server 116, and "query" server 118, which are each individually described below.

Web-crawler server 112 implements an Internet "web crawler", whose function it is to seek out and collect copies of webpages from the World-Wide Web (shown as "Web" 128 in FIG. 4) and store each of those pages as "data items" in the "data items" database 120. For each data item, web-crawling server 112 calculates and stores in the data items database 120 a "query-independent relevance" ("QIR") value. (In some other systems, this functionality may be carried out by a separate server that is independent of the web-crawler server 112.)

Indexing server 114 is an indexing server that (re)numbers the data items in the data items database 120. (Indexing server 114 thus received the QIR value for each data item from the web-crawler server 112.) Indexing server 114 also creates and maintains an inverted index in the data items in the "inverted index" database 122. Thus, indexing server 114 is responsible for actually reviewing each data item and determining what key words are in the data item and then inserting a posting to the relevant posting lists in respect of that data item.

Searching server 116 is a searching server that receives search queries from query server 118 (see below), performs searches across the inverted index stored in the inverted index database 122 in respect of such search queries, and builds a QIR-ordered search result list.

Query server 118 is a query server that receives and parses search queries from search requesters (represented by personal computer icon 126); and for each search query received, query server 118 initiates a search operation by the searching server 116. Query server 118 obtains the QIR-ordered "search result list" from searching server 116 in respect of the search. Query server 118 calculates for at least some of the data items in the search result list a "query-specific relevance" ("QSR"), and query server 118 builds a QSR-ranked search result list in respect of the search. Query server 118 also builds the visual presentation for the search list. Query server 118 extracts a "title" and a query-specific "snippet" from the data items database 120 (not particularly shown in the drawings) for each data item in the search result list. Query server 118 delivers to the search requester 126 portions of the QSR-ranked search list, together with their titles and snippets, and the visual presentation to be used. Query server 118 further records the search requester's actions of "clicking through" on some of the data items shown to them as part of the search results, and stores appropriate data regarding such click-throughs in its "query database" 124. Query server 118 also searches information regarding past queries in the query database 124 when preparing the search results for a current query and defines the QSR-ranking of at least some search results as a function of the information found in the query database 124 before delivering the search results to the search requester.

Search Engines—Server Operations

Having described the general overall functions of each of the servers 112, 114, 116, and 118, some of the specific operations of the servers 112, 114, 116 and 118 will now be described. In this respect, web-crawling server 112 implements a web crawler that (permanently or periodically—as the case may be) explores the World Wide Web finding new (or recently updated) web pages (illustrated by data path 130). For each such web page that is found a data item is created in the data items database 120 (illustrated by data path 132). Each data item in the data items database 120 includes a local copy of the corresponding web page on the Internet, a hyperlink to the original web page on the Internet (also called its web address), and a set of data-item attributes that were assigned to the data item during the course of its processing by the search engine system 100.

With respect to any new data item, the first operation carried out is to define that data item's QIR value. As QIR values are used for data items ordering, they are typically implemented as a numerical (although not necessarily an integerial) characteristic of a data item. A QIR value is calculated by the search engine system 100 using many different attributes of the data item itself (including, but not limited to, its title, creation date, original web page location, etc.), and using the number and qualities of references to that data item on other Web pages, and likely also using some "historical" data having been "learned" by the system 100 from data items having been previously entered into the system, from previously executed search queries, and other conventionally-used information. In this respect, there exist a few methods that are well-known in the art for defining a QIR value in a practical suitable manner In most Internet search engine systems, the calculation of a QIR value for each new data item is performed by the web-crawler server 112; however in some others it is performed by a different server, such as, for example, indexing server 114 or a dedicated QIR server.

Each data item stored in the data items database 120 is known within the system 100 by its unique system-assigned identifier, which is typically an ordinal number. Typically, the entire collection of data items managed by a large Internet search engine is too large to be contained on one database server, and thus it is customarily split into several database "shards". Where such is the case, each shard will typically have its own data item numbering scheme and its own logic for performing a search on its portion of the document database. When executing a search query each of the partial per-shard search result lists, once generated, are merged into one common QIR-ordered list, which is then QSR ordered.

Data items are numbered by the system 100 in descending order of their QIR, rather than in the order that they were obtained by the web-crawler server 112. Data items having the same QIR can be numbered in any order, for example in inverse chronological order (the latest data items being assigned lesser numbers, in order to be found before the earlier ones). Hence, if a newly received data item D appears to have its QIR value less than that of an existing data item (say #999), but greater than or equal to the QIR value of the next data item (#1000), then D will be assigned #1000, while the old #1000 will become #1001 and so on. Hence, both the data item numbers and the content of the inverted index (see below) are permanently and periodically updated. Typically, the data item (re)numbering operation is performed by the indexing server 114, but this is not required to be the case.

Once a data item (e.g. D) is received by the web crawler server 112, stored in the data items database 120, assigned its QIR value, assigned its data item number (e.g. #1000), it is passed on to the indexing server 114 (data path 134 on FIG. 4) for further processing by the latter (bidirectional data path 136). The indexing server 114 manages its database 122 (bidirectional data path 138), which basically comprises an inverted index of the data item collection contained in the data items database 120.

Postings & Posting Lists

As was described hereinabove, the inverted index basically comprises a number of posting lists. The indexing server 114 inspects the new data item #1000, discerns in it various "searchable terms", and for each searchable term found in the data item it creates a new entry (e.g. a "posting") in the appropriate posting list.

A posting in a posting list basically includes a data item number (or other information sufficient to calculate a data item number), and optionally includes some additional data. Every posting list corresponds to a searchable term, and comprises a series of postings referencing each of those data items in the data items database 120 that contain at least one occurrence of that searchable term.

Additional data may also be found in a posting; for example, the number of occurrences of a given searchable term in a given data item; whether this search term occurs in the title of the data item, etc. This additional information may be different depending on the search engine.

Searchable terms are typically, but not exclusively, words or other character strings. A general use Internet search engine typically deals with practically every word in a number of different languages, as well as proper names, numbers, symbols, etc. Also included may be "words" having commonly found typographical errors. In the present specification, any such searchable term may be referred to as a "word" or a "term". For each searchable term that has been encountered in at least one data item, the indexing server 114 updates the corresponding posting list, or creates a new one if the term is being encountered for the first time. Hence the total number of posting lists may be as large as a few million. The length of a given posting list depends on how commonly used the corresponding word is in the data items universe (e.g. on the Internet). A very commonly used word may have a posting list of as long as one billion entries (or even more—there is no limit). (In practical use, when the data items database 120 is split into several "shards", each shard maintains its own separate inverted index 122, thus greatly reducing the length of posting lists in each shard.)

In each posting list, data item postings are placed in an ascending order of their data item numbers, that is, in the descending order of their QIR. Hence, the process of indexing a new data item D is not limited to inserting the data item number of D, say #1000, into the posting list of every word $T_i$ occurring in D. Rather, when assigning to D an already existing data item number #1000, every existing posting in every posting list, to data item number equal or greater than #1000, must be updated (incremented by 1 in this example). In actuality, search engines typically perform this update operation periodically for batches of data items having been received since the previous time that the inverted index database 122 was updated.

Execution of Search Queries

Figure 1:
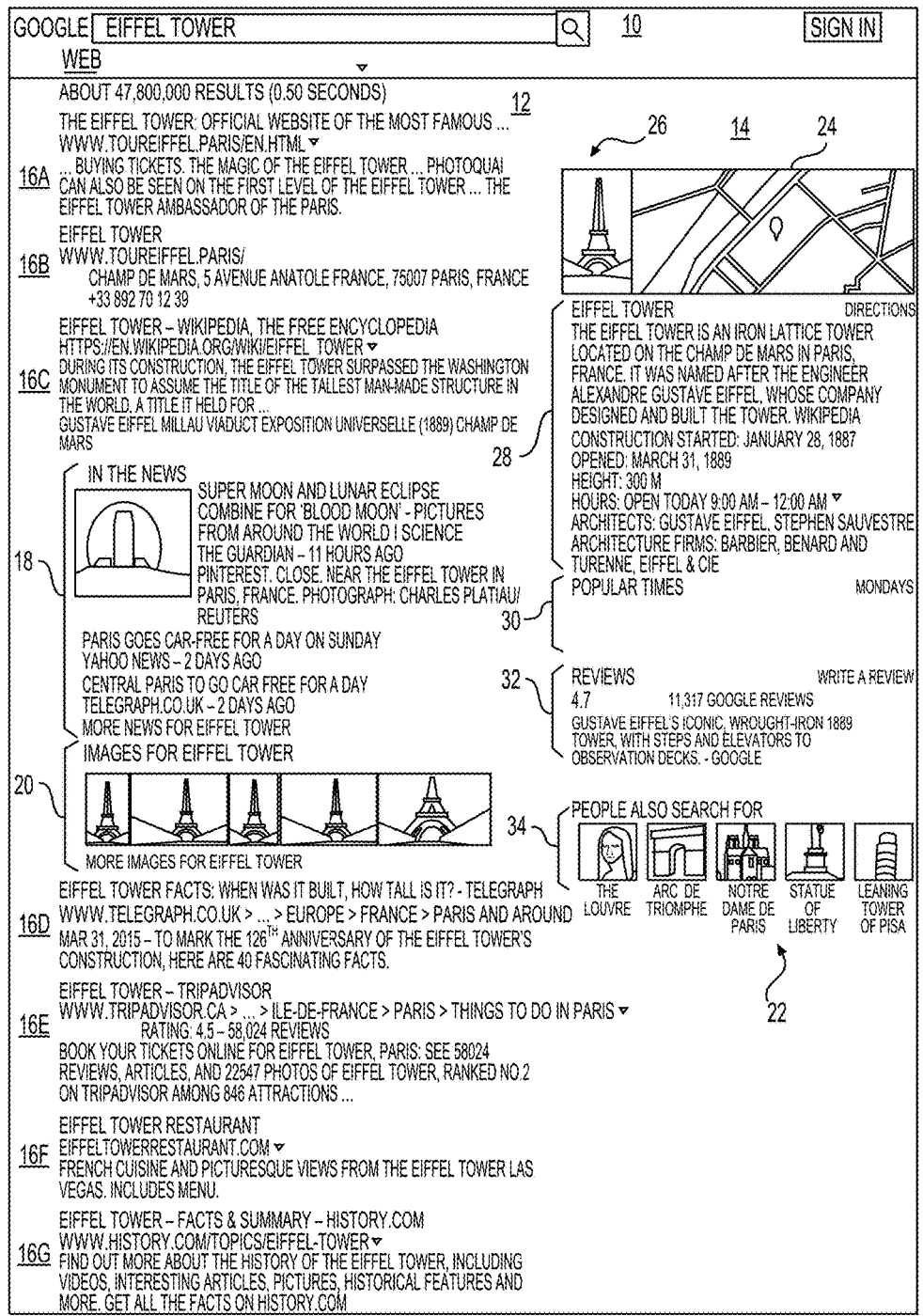
FIG. 1 shows a conventional SERP of the Google™ search engine system operated by Google Inc. for the search query "eiffel tower"
Figure 2:
FIG. 2 shows a conventional SERP of the DuckDuckGo™ search engine system operated by DuckDuckGo, Inc. for the search query "eiffel tower"
Figure 3:
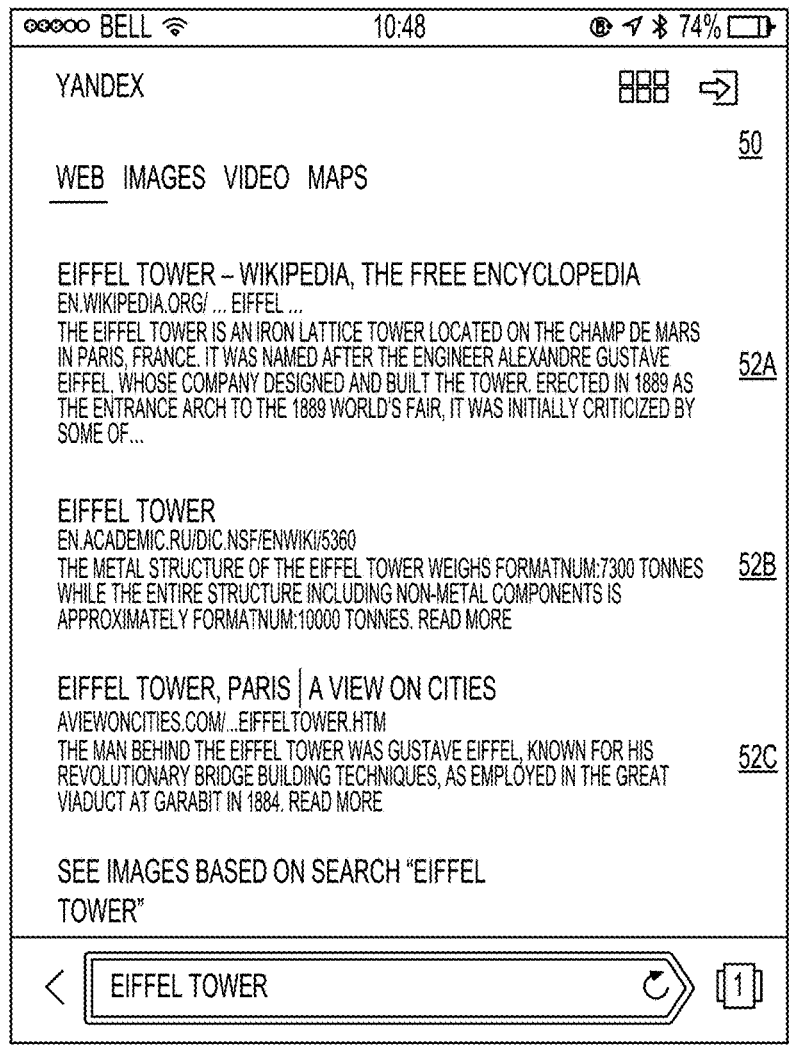
FIG. 3 shows a conventional SERP of the Yandex™ search engine system operated by Yandex LLC for the search query "eiffel tower"

Data items stored in the data items database 120 and indexed in the inverted index database 122 can then be searched for. Again with reference to FIG. 4, search queries are made by human users ("search requesters" which are collectively depicted on FIG. 1 by an image of a personal computer 126) and are received by the query server 118 (data path 150 in FIG. 4). The query server 118 parses each search query received into its various search terms (which may include optionally dropping auxiliary words such as prepositions and conjunctions not to be searched for because of their ubiquity), and may also perform some other convention actions. For example, a search query $Q_1$, received at time $t_0$, may comprise four search terms $T_1$, $T_2$, $T_3$, $T_4$, which may be denoted as $Q_1[T_1,T_2,T_3,T_4]$.

The query $Q_1$ is then passed by the query server 118 to the searching server 116 (data path 144). The latter basically operates on the inverted index database 122, that is, on the inverted index with its many posting lists. In this example, the search process, or execution of a search query, consists of finding the data item numbers of all those data items that contain occurrences of each search term specified in the search query (as was discussed above this is the simplest form of a search process; in a further example described below a quorum principle will be introduced). Typically, this is done by exploring in parallel each of the posting lists corresponding to the search terms of the query, starting from the beginning of each posting list. In the present example, posting lists $P_1$, $P_2$, $P_3$, $P_4$ correspond to the search terms $T_1$, $T_2$, $T_3$, $T_4$ respectively. (In a more general manner the posting list corresponding to a term $T_n$ is denoted in this specification as $P_n$). A data item whose number is encountered in each posting list relevant to the search query is considered to be a search result (sometimes also called a "hit"), and is placed in a search result list as the search result list's then next element (i.e. after hits already having been placed in the result list). In this way, the search result list of a search query is in ascending order of data item numbers, and thus in descending order of QIR value.

This procedure of finding further search results stops either when reaching the end of one of the posting lists, or when some "pruning condition" (as was mentioned above) has been satisfied. In various examples, the pruning condition might, for example, be defined by the query server 118 on a per query basis and provided with each query Q by the query server 118 to the searching server 116; alternatively the pruning condition might be fixed with respect to the system and be the same for all queries. In either case, the pruning condition could be expressed, for example, as a maximum number of data items in the search result list, or as a minimum QIR value for a data item to be included in the search result list, or in another different conventional matter. In any case, application of a pruning condition is supposed to "pick" the best results in terms of their QIR.

The search result list prepared by the search server 116 for a given query, e.g. for $Q_4$, is then sent back by searching server 116 to the query server 118 (data path 142). (In the following description the search result list for a query $Q_m$ is denoted as "$R(Q_m)$", with each of the individual listings in list $R(Q_m)$ being denoted $R_y(Q_m)$). In terms of two-stage query execution described above, the first stage—collection of search results—is now terminated, and the second stage, that of ranking, or reordering, of the search result list starts. In this respect, the query server 118, before delivering the results to the search requester, reorders them in a way presumably most suitable for this particular given query, by placing at the highest positions in the list those search results (data items) that have the highest query-specific relevance (QSR) for that particular given query. This QSR-ranking and reordering of the originally QIR-ordered search result list is probably the most sophisticated operation performed by a Web search engine, and the one most influencing final user (e.g. search requester) satisfaction.

In order to define in a best QSR ranking for a particular given query, information from many different sources is taken into account at the same time. Part of the information used assessing the QSR of a data item may be found in the data item itself; for example, the total number of occurrences in the data item of each search term of the given search query; occurrences of two or more of the search terms found in close proximity to each other (e.g. in the same phrase), or, yet better, following each other in the same order as in the search query; search terms found in the title of the document, etc. However, all these are limited-scope criteria that might not necessary reflect the level of "user satisfaction" with a given data item in the context of a given particular query.

Web search engines make use of historical information collected from a large quantity of previously executed search queries, and stored in a database. This "query database" is shown on FIG. 4 in association with reference number 124, and accessed by the query server 118 via bidirectional data-path 146. From each query, diverse information can be extracted, stored and processed, and then used for better QSR-ranking of results for the next query. In the context of the present example, only "click-through" data as was briefly discussed above is considered to be relevant. In this respect, a user $U_1$ having made a search query, say, $Q_1[T_1,T_2,T_3,T_4]$, receives from the query server 118 a list of search results having been found for the query by the searching server 116 and further having been ranked by the query server 18 (as was previously discussed above). In many cases the list is very long, so it is sent to the user in portions (or "pages") of, for example, 120 entries each. Every entry is "clickable", that is, if clicked by the user with their mouse or other pointing device, causes the data item to open, for example, in another window or another tab of the browser application on the user's computer. It is likely beneficial for the user to be provided with a quick glance at each of the search results prior to opening them, so that they do not waste their time having to open data item after data item trying to locate the right one. To that end, the query server 118 typically provides the user with a "snippet", a short citation (or a few yet shorter fragments collected together) from the data item where the requested search terms occur in a presumably self-explanatory context. After looking at the snippet (as well as the other information provided) the user can decide whether to open the data item (by "clicking through" to it), or not.

Illustration of Use of Click-Through Data

Upon opening a data item, the user can look at it more carefully and decide whether it is definitely of interest to them or not. While the search engine has no way of explicitly "knowing" whether or not the data item is of interest to the user, the search engine can record the mere fact of the user having clicked-through to a given data item appearing on the search result page. This is because the search result page is typically provided to the user by the search engine in a Web application that is typically programmed in a way that every "click-through" action on the page is first sent back to the search engine (in the present example to query server 118 of the system 100). The query server 118 then redirects the user to the web-page of the requested data item (or, alternatively, shows them a copy of the data item stored in the data items database 120). In this way, the query server 118 is capable of recording all the click-through actions performed by users on search result pages provided to them.

It has been statistically verified that, among search results of a query that have been effectively shown to the query issuer, those that have been clicked-through by them were on average of more interest to them than those not clicked-through. Moreover, the last clicked-through data item in the list, that is, the one after which the user stopped further inspection of the list and did not click through to any other items, has proven to be on average of yet more interest to the user than all the previously clicked-through documents. These statistical considerations and "click-through history" are used for better ranking a search result list for every next search query, by using the "click-through history" from past search queries.

The query database 124 stores click-through data from past queries in the form of records $<D_k; Q_m[T_1,T_2,T_3, \ldots T_n]>$ indicating that the document $D_k$ had been clicked through by the issuer of the query $Q_m[T_1, T_2, T_3, \ldots T_n]$ when he/she was exploring the search results for that query. Optionally, there could also be recorded (and then used at same later time) data with respect to the search requester (e.g. their IP address), the query execution time; etc. The above collection of records represents a database that can be sorted by documents clicked through, or by some or all the search terms used in queries, or in any other way.

Figure 5:
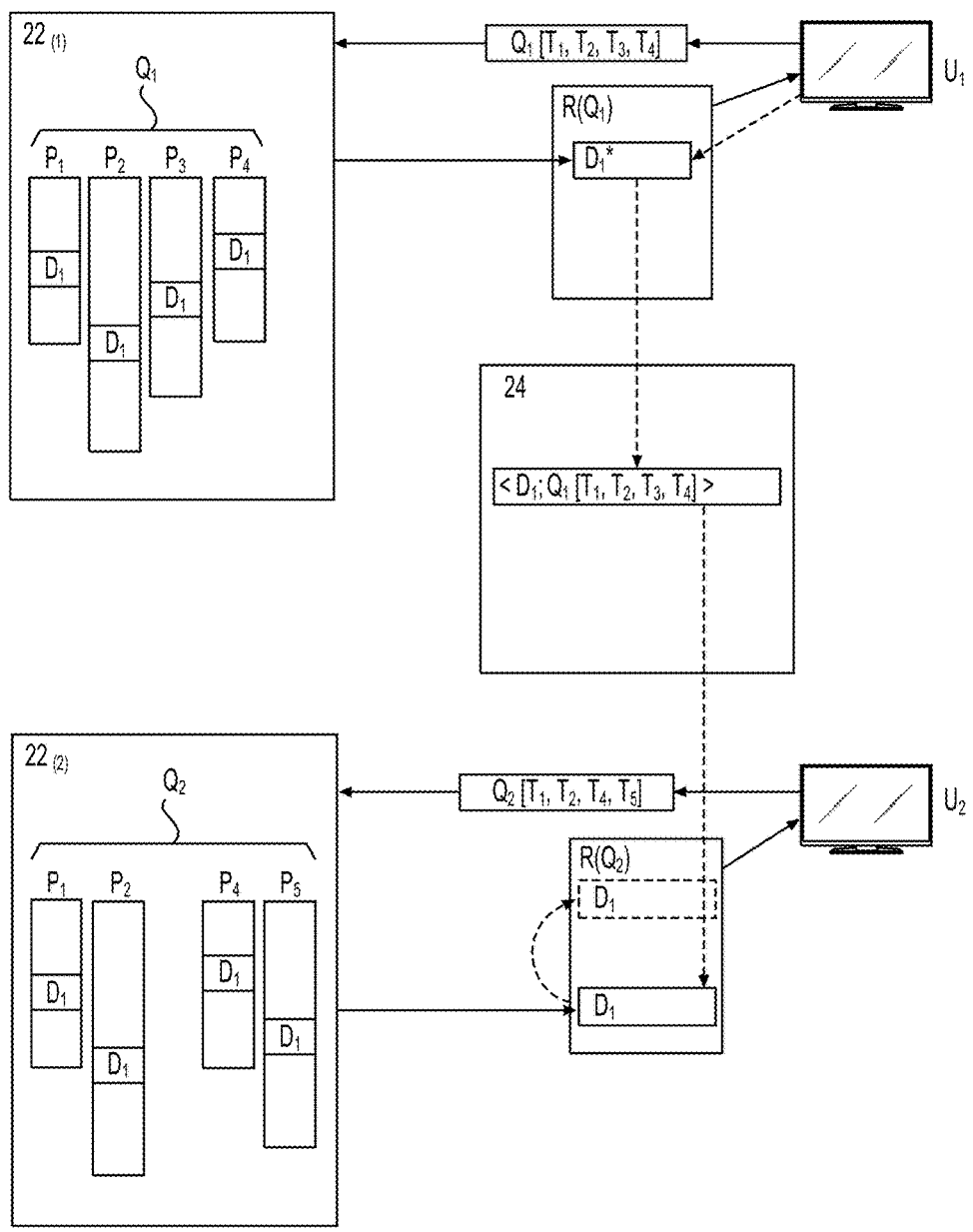
FIGS. 5 and 6 illustrate example searches performed according to the present technology.
Figure 6:
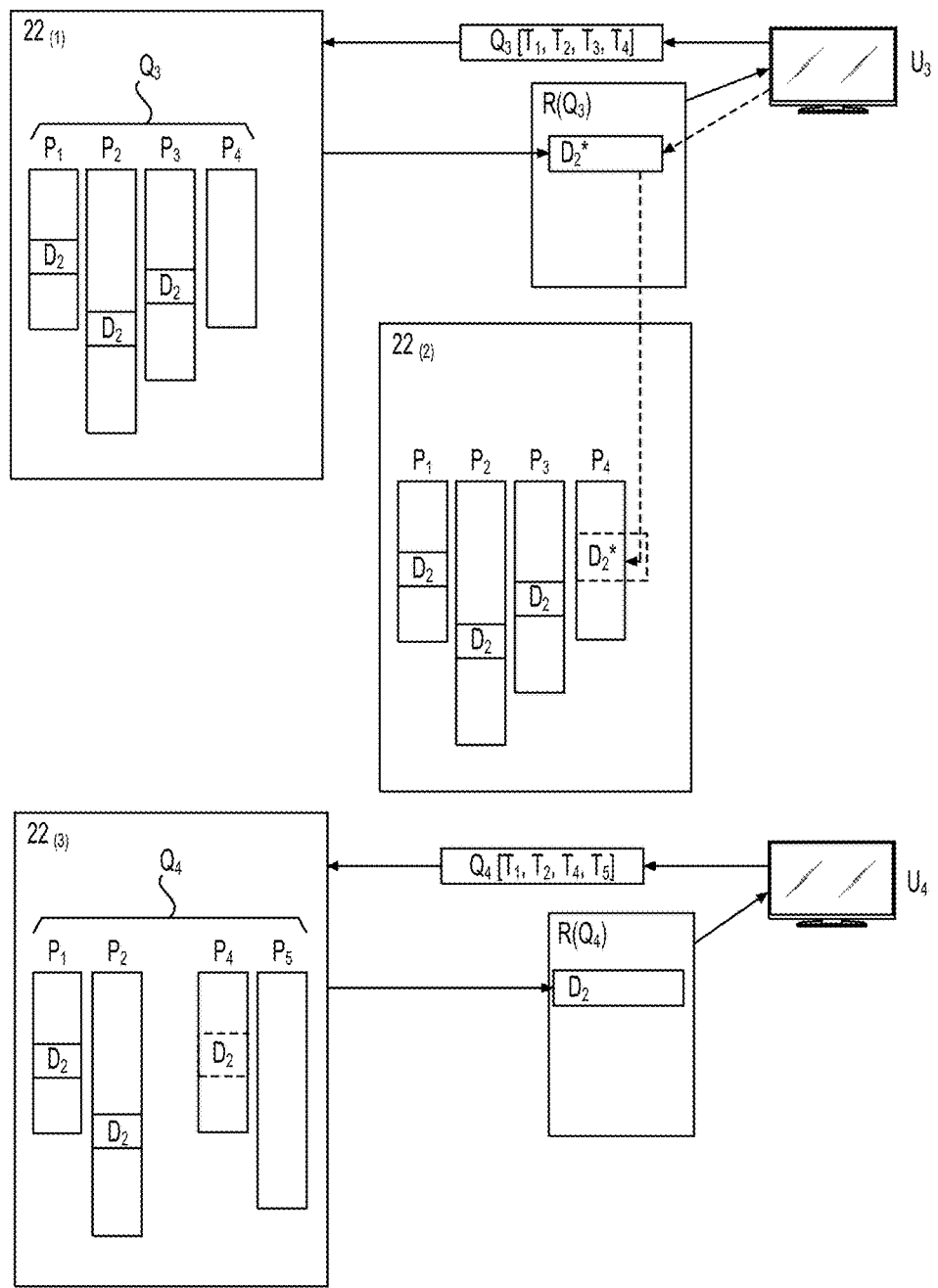

In FIG. 5, for example, the user $U_1$ issues a query $Q_1[T_1,T_2,T_3,T_4]$, which is executed by the searching server 116 by examining the posting lists $P_1, P_2, P_3, P_4$ of the search terms $T_1, T_2, T_3, T_4$ (respectively) of the search query $Q_1$. Illustratively, a data item $D_1$ (more exactly, a posting (i.e. a reference) to $D_1$) is found in each of these posting lists; hence $D_1$ is included in the search result list $R(Q_1)$ for the query $Q_1$. The search result list is, after some QSR reordering, presented to the user $U_1$. The user $U_1$ clicks through the entry corresponding to the data item $D_1$ in the list, considering that it might be of interest to them. (The fact of a data item having been clicked through is schematically indicated on both FIG. 5 and FIG. 6 by an asterisk "*".) This information is stored in the query database 24 as a record $<D_1; Q_1[T_1, T_2, T_3, T_4]>$.

At some later point in time, by comparing queries with "almost the same" search terms, and/or with "mostly the same" search result lists, especially those with "mostly the same" subsets of their "clicked-through" results, the system 100 (namely, its query server 118) can establish some "degree of similarity" among past queries, and also between a next query, e.g. $Q_2$, and some of the past queries, e.g. $Q_0$. As how this occurs is both complicated and conventional the details thereof will not be discussed herein; what is important for present purposes is to understand how information from past queries similar to a current query $Q_2$ is conventionally used to help a search engine to deliver more appropriate results to the current search requester.

In this respect, if a then current query, e.g. $Q_2$, is found to be similar to some past query, e.g. $Q_1$, and if among the search results for $Q_2$ there is a data item $D_1$, for which a record $<D_1; Q_1[ \ldots ]>$ exists in the query database 124, signifying that the document $D_1$ was among the results for $Q_1$ as well, and, moreover, had been clicked through by a past issuer of $Q_1$, then the data item $D_1$ is considered as being of higher QSR for $Q_2$ than other results for $Q_2$ with same or similar other characteristics. In other words, the above criterion of "having been clicked through in one or more past similar queries", while not decisive, is used as one of the criteria capable of increasing the QSR of $D_1$ for $Q_2$, and hence of pushing $D_1$ higher in the ordered list of search results for $Q_2$. Thus $D_1$ will be shown to the search requester in the search result list at an earlier time (i.e. at a higher position in the list) than it would have been had $D_1$ not previously been clicked through.

This is illustratively shown on FIG. 5. A user $U_2$ (which may be the same as $U_1$ or may be another user) issues a search query $Q_2[T_1,T_2,T_4,T_5]$ that differs from the previously considered query $Q_1[T_1,T_2,T_3,T_4]$ in that it does not include the search term $T_3$, but rather includes some other search term $T_5$ instead. Again, the searching server 116 looks through the posting lists corresponding to the search terms, this time the posting lists $P_1$, $P_2$, $P_4$, $P_5$ corresponding to search terms $T_1$, $T_2$, $T_4$, $T_5$ of the query $Q_2$. (In FIG. 5 this is shown in a second image of the indexing database 122, denoted 22(2).) Illustratively, the same document $D_1$ is again found in each of the posting lists; hence $D_1$ is included in the search result list $R(Q_2)$ for query $Q_2$. However, this time the result list $R(Q_2)$ contains too many other documents of presumably higher relevance to the user $U_2$, for the document $D_1$ to be even shown to them. This is illustratively depicted on FIG. 5 by placing $D_1$ in a lower position within the list $R(Q_2)$.

In according to conventional use of click-through data, however, the query server 118 (not shown on FIG. 5), before presenting the result list $R(Q_2)$ to the user $U_2$, looks up in the query database 124, and finds there (amongst probably other information) the previously stored record $<D_1;Q_1,[T_1,T_2,T_3,T_4]>$ showing that the document $D_1$ had been clicked through in one of the previous queries, namely in the query $Q_1[T_1,T_2,T_3,T_4]$ that differs from the then present query $Q_2[T_1,T_2,T_4,T_5]$ by just one of their four search terms. Considering that the fact that it had been clicked through brings some additional value to $D_1$, the query server 118 now upgrades the document $D_1$ to a higher position in the list $R(Q_2)$, as shown by a dotted-arc arrow on FIG. 5, such that $D_1$ will now be presented to user $U_2$.

Figure 7A:
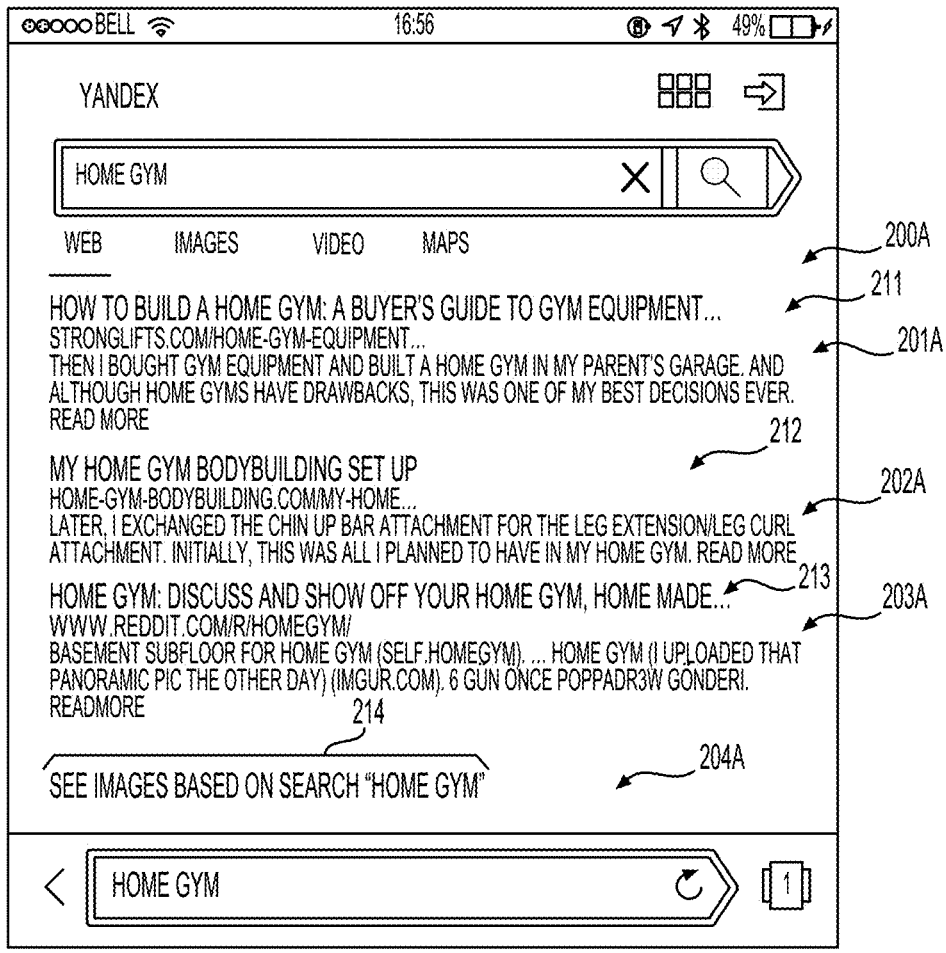
FIGS. 7A, 7B, and 7C show a SERP of the Yandex™ search engine system for the search query "home gym", via the Yandex Search app for iOS running on an Apple™ iPhone™ smartphone according to the present technology.
Figure 7B:
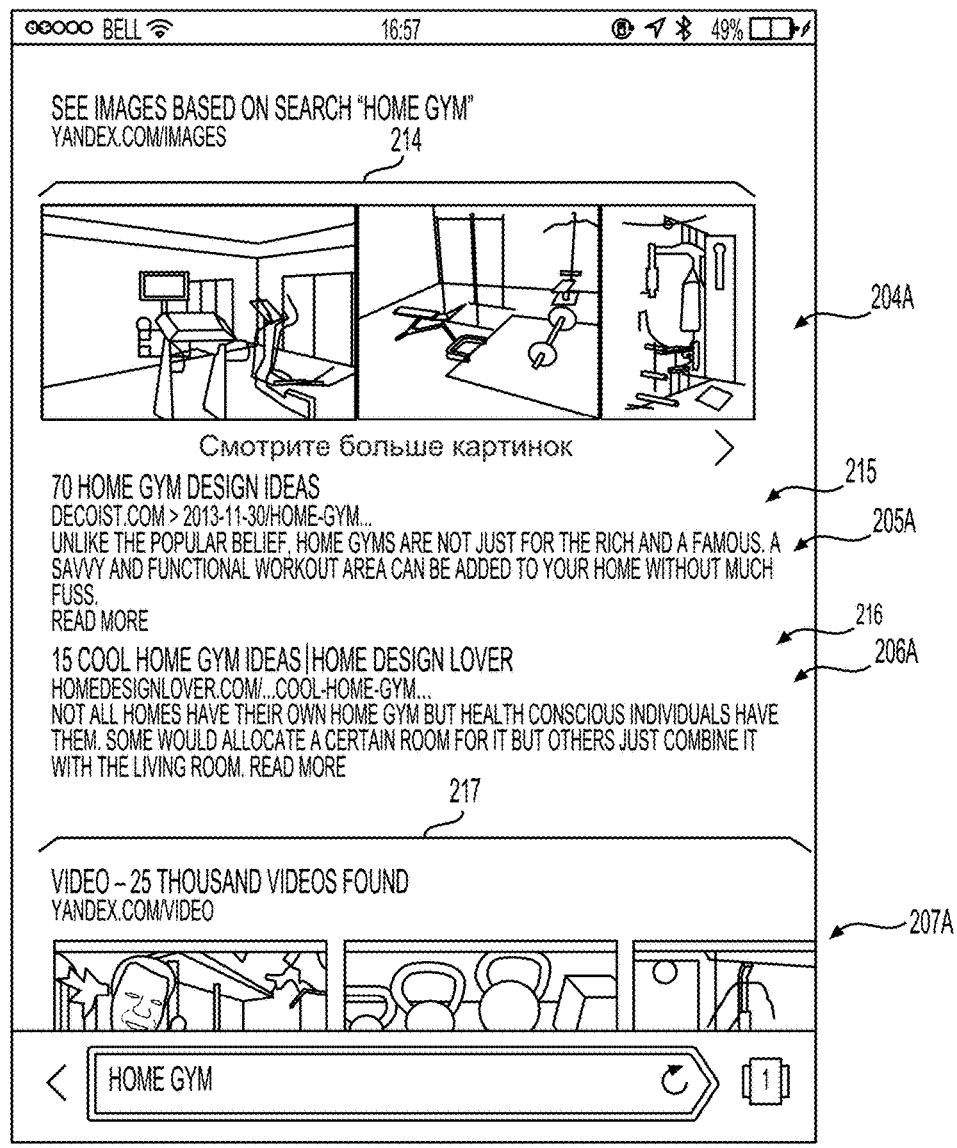
Figure 7C:
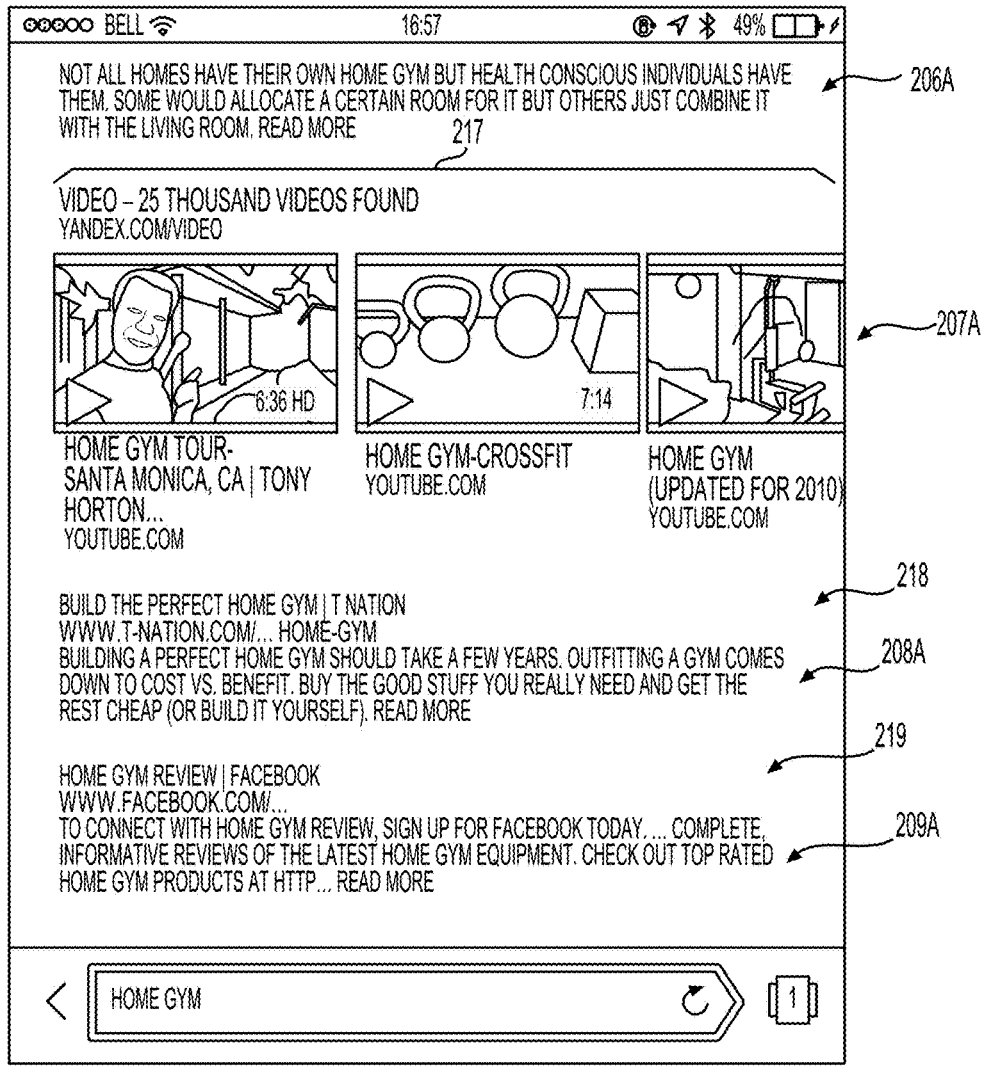

FIGS. 7A, 7B, and 7C show a SERP 200A of the Yandex™ search engine system for the search query "home gym", via the Yandex Search app for iOS running on an Apple™ iPhone™ smartphone. The SERP 200A was generated in accordance with the procedure set forth above, which, for purposes of brevity, will not be repeated here. The search results are listed in QSR order, as the query server 118 has determined (via information stored in Query database 124) that, because the search results are being accessed via a smartphone app, the probable user search result interaction sequence is the QSR.

Thus, starting from the top of the SERP 200A, the first listed search result 201A is URL stronglifts.com/home-gym equipment . . . 211, along with the title of the resource that is found at URL 211, and a textual snippet of the information provided by the resource. The second listed search result 202A is URL home-gym-bodybuilding.com/my-home . . . 212, along with the title of the resource that is found at URL 212, and a textual snippet of the information provided by the resource. The third listed search result 203A is URL www.reddit.com/r/homegym/ 213, along with the title of the resource that is found at URL 213, and a textual snippet of the information provided by the resource. The fourth listed search result 204A is an image selector widget 214. The fifth listed search result 205A, is a URL decoist.com/2013-11-30/home-gym . . . 215, along with the title of the resource that is found at URL 215, and a textual snippet of the information provided by the resource. The sixth listed search result 206A, is a URL homedesignlover.com/ . . . cool-home-gym . . . 216, along with the title of the resource that is found at URL 216, and a textual snippet of the information provided by the resource. The seventh listed search result 207A is a video selector widget 217. The eighth listed search result 208A is a URL www.t-nation.com/ . . . home-gym, along with the title of the resource that is found at URL 218, and a textual snippet of the information provided by the resource. The ninth listed search result 209A is a URL www.facebook.com/ . . . , along with the title of the resource that is found at URL 219, and a textual snippet of the information provided by the resource.

Figure 8:
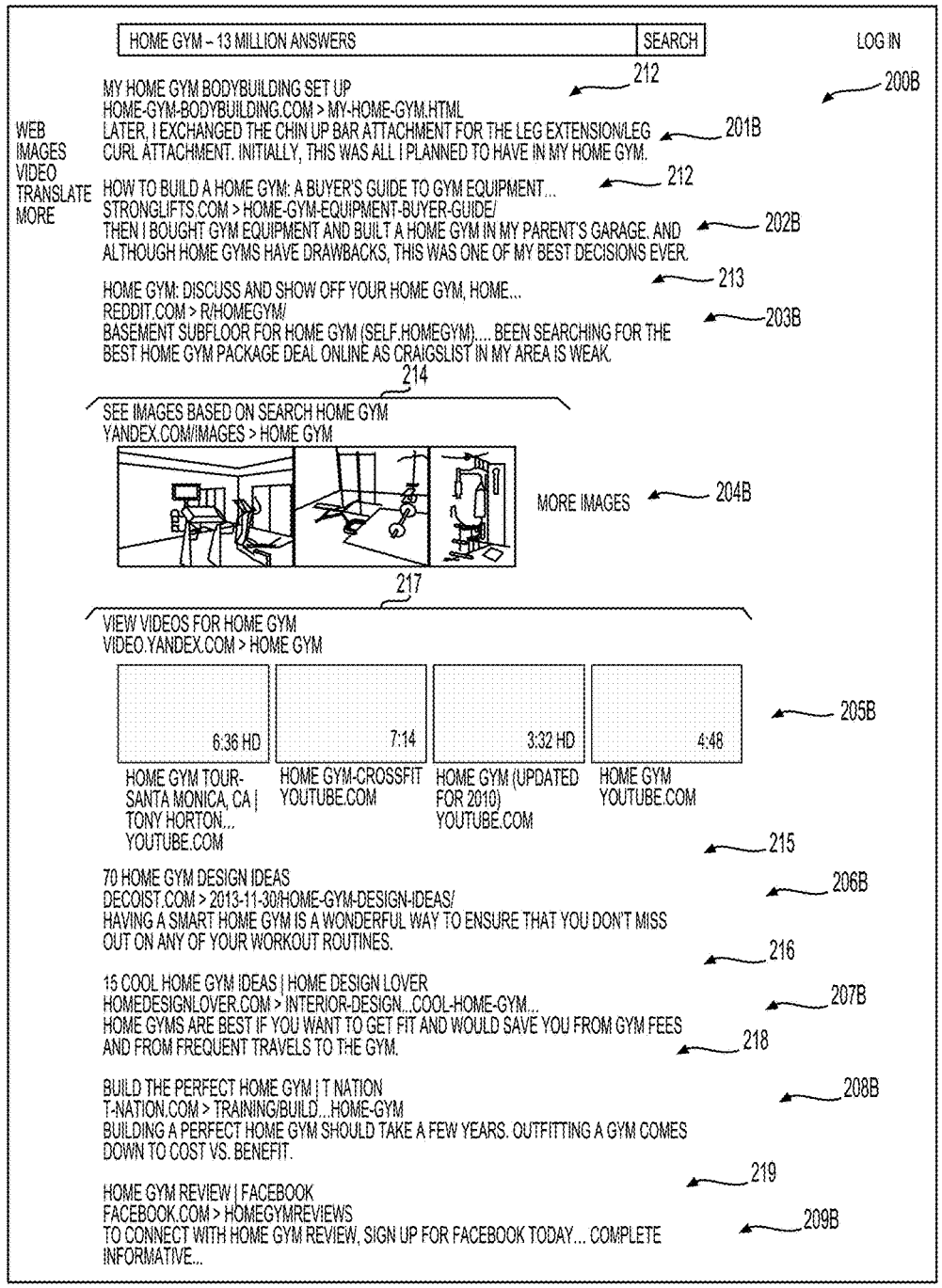
FIG. 8 shows a SERP of the Yandex™ search engine system for the search query "home gym", via a desktop web browser according to the present technology.

FIG. 8, by contrast, shows a SERP 200B of the Yandex™ search engine system for the search query "home gym", via a desktop web browser at the URL www.yandex.com. The SERP 200B was generated in accordance with the procedure set forth above, which again, for purposes of brevity, will not be repeated here. The difference between SERP 200B and SERP 200A, which are for identical search terms, is that query server 118 has determined (via information stored in Query database 124) that, because the search results are being accessed on a desktop browser, probable user search result interaction sequence is not the QSR. Therefore, the query server 118 has provided instructions to display the search results in not in accordance the QSR, but in accordance with the probable user interaction sequence. This results in SERP 200B being visually configured differently from SERP 200A.

Starting from the top starting from the top of the SERP 200B, the first listed search result 201B is URL home-gym-bodybuilding.com/my-home . . . 212, along with the title of the resource that is found at URL 212, and a textual snippet of the information provided by the resource. As can been seen in FIGS. 7A-C, however, URL 212 is actually the second search result in terms of QSR.

The second listed search result 202B is URL stronglifts.com/home-gym equipment . . . 211, along with the title of the resource that is found at URL 211, and a textual snippet of the information provided by the resource. As can been seen in FIGS. 7A-C, however, URL 211 is actually the first search result in terms of QSR.

The third listed search result 203B is URL www.reddit.com/r/homegym/ 213, along with the title of the resource that is found at URL 213, and a textual snippet of the information provided by the resource. As can been seen in FIGS. 7A-C, URL 213 is also the third search result in terms of QSR.

The fourth listed search result 204B is an image selector widget 214. As can been seen in FIGS. 7A-C, image selector widget 214 is also the fourth search result in terms of QSR.

The fifth listed search result 205B is a video selector widget 217. As can been seen in FIGS. 7A-C, however, video selector widget 217 is actually the seventh search result in terms of QSR.

The sixth listed search result 206B, is a URL decoist.com/2013-11-30/home-gym . . . 215, along with the title of the resource that is found at URL 215, and a textual snippet of the information provided by the resource.

The seventh listed search result 207B, is a URL homedesignlover.com/ . . . cool-home-gym . . . 216, along with the title of the resource that is found at URL 216, and a textual snippet of the information provided by the resource. As can been seen in FIGS. 7A-C, however, URL 216 is actually the sixth search result in terms of QSR.

The eighth listed search result 208B is a URL www.t-nation.com/ . . . , home-gym, along with the title of the resource that is found at URL 218, and a textual snippet of the information provided by the resource. As can been seen in FIGS. 7A-C, URL 218 is also the eighth search result in terms of QSR.

The ninth listed search result 209B is a URL www.facebook.com/ . . . , along with the title of the resource that is found at URL 219, and a textual snippet of the information provided by the resource. As can been seen in FIGS. 7A-C, URL 219 is also the ninth search result in terms of QSR.

Thus, Query server 118 has derived based on previous user interactions with search results that a probable user interaction sequence with the SERP 200B is first looking at the second listed search result 202B, then next looking at the first listed search result 201B, then next looking at the third listed search result 203B, then next looking at the fourth listed search result 204B, then next looking at the sixth listed search result 206B, then next looking at the seventh listed search result 207B, then next looking at the fifth listed search result 205B, then next looking at the eighth listed search result 208B, and finally looking at the ninth listed search result 209B. Thus the search results in terms of QSR are actually visually configured on the page in terms of that probable user interaction sequence.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of furnishing search results to a plurality of client devices via a search engine system, the search engine system including:
at least one server,
a first database comprising an inverted index having a plurality of posting lists in electronic communication with the at least one server wherein each posting list corresponds to a search term and comprises postings indicative of data items that include the search term,
a second database having information related to previous user interactions with search results having been provided by the system in electronic communication with the at least one server,
a third database having a plurality of data items each assigned with a respective data item number;
an indexing server configured to, in response to acquiring a new data item from the third database:
  assign a data item number to the new data item;
  renumber the respective data item number of a subset of the plurality of data items;
  analyze the new data item to determine one or more search terms; and
  generate a posting in the associated posting list, the posting comprising the data item number;
a communications network configured to provide for electronic communication between the at least one server and the plurality of client devices,
the method comprising, via the at least one server:
receiving a search query from a one of the plurality of client devices via the communications network, the search query including search terms and information indicative of a property of an application running on the client device originating the search query, wherein the property indicates desktop browser or smartphone app;
performing a search by exploring in parallel each of the posting lists of the inverted index corresponding to the search terms to determine search results in respect of the search query, wherein a given data item whose number is encountered in each posting list relevant to the search query is considered to be a search result, the search results having a relevance rank order;
determining a probable user search result interaction sequence based on information in the second database and on the information indicative of the property of the application running on the one of the client devices originating the search query, the probable user search result interaction sequence being different from the relevance rank order of the search results and depends on the application property;
sending the search results to the one of the client devices via the communications network, the search results for or displaying on an associated output device of the one of the client devices, the search results including information allowing for visual configuration of the search results provided to the user by the application originating the search query according to probable user search result interaction sequence, while maintaining the relevance rank order.

2. The method of claim 1, wherein the information allowing for visual configuration of the search results includes instructions to display the search results out of relevance rank order.

3. The method of claim 1, wherein the information allowing for visual configuration of the search results includes instruction to display the search results in a non-columnar arrangement.

4. The method of claim 1, wherein the information allowing for visual configuration of the search results includes instruction to display the search results in a non-row arrangement.

5. The method of claim 1, wherein the information allowing for visual configuration of the search results includes instructions to display at least one of the search results differently from others of the search results.

6. The method of claim 5, wherein the at least one of the search results has at least one of the following from the other search results: a different font, a different font size, a different color, a different font style, a different font underline, and a different font effect.

7. The method of claim 1, wherein the information allowing for visual configuration of the search results includes instructions to solely display images associated with a one of the search results next to that one of the search results.

8. The method of claim 1, wherein the information related to previous user interactions with search results having been provided by the system has resulted from use of a machine-learned algorithm.

9. The method of claim 1, further comprising,
receiving from the one of the plurality of client devices via the communications network, information related to then current user interaction with the results; and
updating the information in the second database information related to previous user interactions with search results having been provided by the system, without updating information in the system related to the relevance rank order.

10. A search engine system including:
at least one server;
a first database comprising an inverted index having a plurality of posting lists in electronic communication with the at least one server wherein each posting list corresponds to a search term and comprises postings indicative of data items that include the search term,
a second database having information related to previous user interactions with search results having been provided by the system in electronic communication with the at least one server,
a third database having a plurality of data items each assigned with a respective data item number;
an indexing server configured to, in response to acquiring a new data item from the third database:
assign a data item number to the new data item;
renumber the respective data item number of a subset of the plurality of data items;
analyze the new data item to determine one or more search terms; and
generate a posting in the associated posting list, the posting comprising the data item number; and
a communications network configured to provide for electronic communication between the at least one server and the plurality of client devices;
the server comprising a processor being configured to:
receive a search query from a one of the plurality of client devices via the communications network, the search query including search terms and information indicative of a property of an application running on the client device originating the search query, wherein the property indicates desktop browser or smartphone app;
perform a search by exploring in parallel each of the posting lists of the inverted index corresponding to the search terms to determine search results in respect of the search query, wherein a given data item whose number is encountered in each posting list relevant to the search query is considered to be a search result, the search results having a relevance rank order;
determine a probable user search result interaction sequence based on information in the second database and on the information indicative of the property of the application running on the one of the client devices originating the search query, the probable user search result interaction sequence being different from the relevance rank order of the search results and depends on the application property;
send the search results to the one of the client devices via the communications network, the search results for or displaying on an associated output device of the one of the client devices, the search results including information allowing for visual configuration of the search results provided to the user by the application originating the search query according to probable user search result interaction sequence, while maintaining the relevance rank order.

11. The search engine system of claim 10, wherein the information allowing for visual configuration of the search results includes instructions to display the search results out of relevance rank order.

12. The search engine system of claim 10, wherein the information allowing for visual configuration of the search results includes instruction to display the search results in a non-columnar arrangement.

13. The search engine system of claim 10, wherein the information allowing for visual configuration of the search results includes instruction to display the search results in a non-row arrangement.

14. The search engine system of claim 10, wherein the information allowing for visual configuration of the search results includes instructions to display at least one of the search results differently from others of the search results.

15. The search engine system of claim 14, wherein the at least one of the search results has at least one of the following from the other search results: a different font, a different font size, a different color, a different font style, a different font underline, and a different font effect.

16. The search engine system of claim 10, wherein the information allowing for visual configuration of the search results includes instructions to solely display images associated with a one of the search results next to that one of the search results.

17. The search engine system of claim 10, wherein the information related to previous user interactions with search results having been provided by the system has resulted from use of a machine-learned algorithm.

18. The search engine system of claim 10, wherein the processor is further configured to:
receive from the one of the plurality of client devices via the communications network, information related to then current user interaction with the results; and
update the information in the second database information related to previous user interactions with search results having been provided by the system, without updating information in the system related to the relevance rank order.

* * * * *